United States Patent [19]

Du Moulin

[11] Patent Number: 4,969,321
[45] Date of Patent: Nov. 13, 1990

[54] MULCHER

[75] Inventor: Edward Du Moulin, Collaroy, Australia

[73] Assignee: Wells-Gardner Electronics Corporation, Chicago, Ill.

[21] Appl. No.: 453,568

[22] Filed: Dec. 20, 1989

Related U.S. Application Data

[63] Continuation of Ser. No. 47,372, May 6, 1987, Pat. No. 4,912,917.

[30] Foreign Application Priority Data

May 9, 1986 [AU] Australia ............................ PH5816
Dec. 10, 1986 [AU] Australia ............................ PH9424

[51] Int. Cl.$^5$ ............................................ A01D 34/63
[52] U.S. Cl. .................................. 56/16.9; 241/101.1; A01D/34/63
[58] Field of Search ................. 56/16.9, 17.5, 60, 16.7, 56/10.1; 241/101 R, 101.1

[56] References Cited

U.S. PATENT DOCUMENTS

| | | | |
|---|---|---|---|
| 3,808,782 | 5/1974 | McWilliams | 56/16.9 |
| 3,908,914 | 9/1975 | Cushman | 241/101.7 |
| 4,057,952 | 11/1977 | Brokaw | 56/16.9 |
| 4,150,796 | 4/1974 | Kudo | 241/101.1 |
| 4,169,561 | 10/1979 | Saxton | 241/101.1 |
| 4,263,771 | 5/1981 | Iaboni et al. | 56/16.9 |
| 4,307,844 | 12/1981 | Caron | 241/101.1 |
| 4,446,679 | 5/1984 | Thomas | 56/16.9 |
| 4,478,030 | 10/1984 | Druais et al. | 56/60 |
| 4,796,416 | 1/1989 | Bendig et al. | 56/16.9 |

FOREIGN PATENT DOCUMENTS 2928957 2/1981 France ............................ 56/16.9

OTHER PUBLICATIONS

Popular Science, 10/1978, "Make A Mulcher for Your Mower", p. 178.

Primary Examiner—Thuy M. Bui
Attorney, Agent, or Firm—McDermott, Will & Emery

[57] ABSTRACT

The invention provides a mulching arrangement for a rotary, motor lawnmower. The attachment comprises a base plate on which a motor mower can be removably mounted. A feed hopper is provided for receiving vegetable matter to be comminuted, the feed hopper being provided with one or more feed inlets. The feed hopper includes a substantially planar base, downwardly angled relative to the ground surface and also includes a feed passage through which vegetable matter passes before entering into a cutting region of the lawnmower to be comminuted into mulch and discharged from the mower. The feed passage of the feed hopper is so formed and attached or mounted to the base plate, that on operation thereof a vibratory moment is imparted from the lawnmower to the base of the feed hopper and the feed passage. This vibration combined with the downwardly angled and inclined base of the feed hopper relative to the ground surface substantially enhances passage of vegetable matter through the feed hopper and at least inhibits the clogging of vegetable matter therewithin.

6 Claims, 4 Drawing Sheets

MULCHER

This application is a continuation of my co-pending application serial No 047,372 filed May 6, 1987, which issued on Apr. 3, 1990 as U.S. Pat. No. 4,912,917.

BACKGROUND OF THE INVENTION

This invention relates to mulching devices and arrangements, and more particularly to a device or arrangement or adjunct, for use in conjunction with a convention rotary motor lawnmower.

Arrangements for producing useful horticultural mulch have been known and previously proposed, for example from U.S. patent specification Nos. 3,908,914; 4,150,796 and 4,169,561; also from West German patent specification No De-A-3,404,733.

A typical known device or arrangement, as available on the market, or as previously proposed, has a cutting circle of perhaps 100 mm to 150 mm diameter, the blades usually being driven by, for example, an electric motor or other suitable prime mover. Prior art arrangements suffer from a number of disadvantages, even though many are quite expensive to purchase. For example, there is a difficulty in some arrangements, with engaging such an arrangement with a motor mower, and thereafter maintaining the motor mower and mulcher in a predetermined position relative to each other and at a predetermined angle relative to the ground. In a number of cases prior art arrangements frequently become clogged with vegetable matter such as for example leaves or cuttings, particularly when wet. This detracts substantially from the effective use and operation of such arrangements. Further, some arrangements suffer from inadequate means of passing vegetable matter to be mulched from a hopper to the area where the mulching takes place.

It is therefore an object of at least one aspect of this invention to go at least some way towards overcoming or at least minimizing the problems outlined above.

Other objects of the present invention will become apparent from the following description.

SUMMARY OF THE PRESENT INVENTION

According to one aspect of this invention there is provided a mulching attachment for a rotary, motor lawnmower, said attachment comprising a base plate upon an upper surface of which a rotary, motor lawnmower is removably mountable; and including a feed hopper attached thereto and being adapted to receive vegetable matter to be converted to mulch; an aperture being provided in said base plate; means being provided to allow said base plate to be held in position above and at an inclined angle relative to, ground surface; said hopper including at least one feed inlet therein and an elongate base and feed passage; said feed hopper base being substantially planar and inclined downwardly at an angle relative to said ground surface; said feed passage extending into a mouth which communicates with said base plate; said feed passage being so formed and mounted relative to said base plate, that on operation of a lawnmower mounted on said base plate, a vibratory moment is imparted from said lawnmower and base plate to said feed hopper; the arrangement being such that vegetable matter is fed into said feed hopper through at least one feed inlet; said vibration imparted to said feed passage and the base of said feed hopper, combined with said downwardly inclined base of said feed hopper, enhancing passage of said vegetable matter therethrough and inhibiting or preventing clogging of vegetable matter as it passes over the base of said feed hopper and through said feed passage; said vegetable matter thereafter being drawn through the mouth of said feed passage by suction generated by operation of said lawnmower, to enter a cutting zone of said lawnmower and to be thereafter discharged therefrom.

According to a further aspect of this invention there is provided a mulching attachment for a rotary, motor lawnmower, said attachment comprising a base plate upon an upper surface of which a rotary, motor lawnmower is removably mountable; and including a feed hopper attached thereto and being adapted to receive vegetable matter to be converted to mulch; an aperture being provided in said base plate; means being provided to allow said base plate to be held in position above and at an inclined angle relative to, ground surface; said hopper including at least one feed inlet therein and an elongate base and feed passage; said feed hopper base being substantially planar and inclined downwardly at an angle relative to said ground surface; said feed passage extending into a mouth which communicates with said base plate; said feed passage being so formed and mounted relative to said base plate, that on operation of a lawnmower mounted on said base plate, a vibratory moment is imparted from said lawnmower and base plate to said feed hopper; the arrangement being such that vegetable matter is fed into said feed hopper through at least one feed inlet; said vibration imparted to said feed passage and the base of said feed hopper, combined with said downwardly inclined base of said feed hopper, enhancing passage of said vegetable matter therethrough and inhibiting or preventing clogging of vegetable matter as it passes over the base of said feed hopper and through said feed passage; said vegetable matter thereafter being drawn through the mouth of said feed passage by suction generated by operation of said lawnmower, to enter a cutting zone of said lawnmower and to be thereafter discharged therefrom; and wherein a pair of laterally spaced apart swingable arms are pivotally mounted to said base plate, one on each side thereof and both extending downwardly below an underside of said base plate; an elongate transverse axle shaft extending therebetween below, and being mounted to the underside of said base plate; and wheels being rotatably mounted at or adjacent distal ends thereof; lever means being connected to or formed with at least one of said arms; movement of said lever means to a position in substantial juxtaposition with said base plate moving said arms and wheels into a position relative to the base plate and the ground, whereby said base plate is adjacent and/or at a slight angle to the ground surface such as to allow for mounting or removal of a mower to or from said upper surface of said base plate; further movement of said lever means to a predetermined position, moving the arms and wheels relative to the base plate such that the base plate is positioned substantially above the ground, at a predetermined or desired angle thereto, means being provided to releasably engage with said lever means such as to maintain said base plate in such a position substantially above and at an angle relative to, the ground, for a predetermined or desired period of time.

BRIEF DESCRIPTION OF THE DRAWINGS

In order that the reader may gain a better understanding of the present invention, hereinafter will be described some preferred embodiments thereof, by way of example only and with reference to the accompanying drawings in which.

DETAILED DESCRIPTION OF THE PREFERRED EMBODIMENTS

Figures 1, 2:
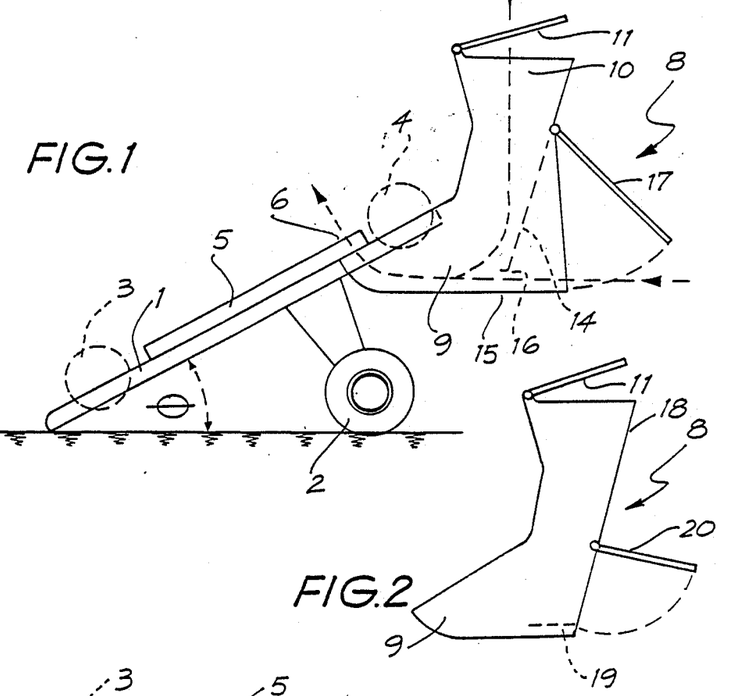
FIG. 1 is a somewhat schematic side elevation of the invention mulching attachment.
FIG. 2 illustrates a minor variation.
Figures 3, 4:
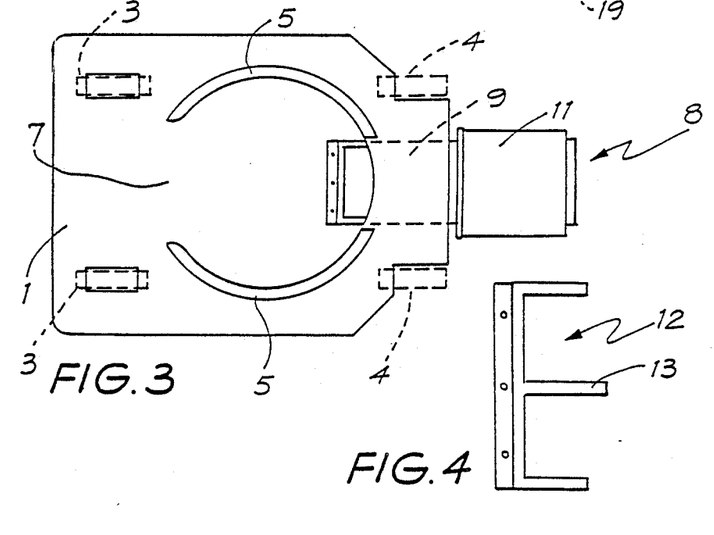
FIG. 3 is a plan view corresponding to the side elevation of FIG. 1.
FIG. 4 shows an alternative cutter bar.

In a first embodiment of the inventive mulching attachment there is a base plate 1 having a pair of ground engaging wheels, as 2. Upon the upper surface of base plate 1 is removably mountable a conventional rotary motor lawnmower, the mower not being shown in the drawings but the notional position of its wheels being indicated in chain-line at 3, 4. The skirt of the mower fits snugly within a raised part-circular land 5 and covers the mouth 6 of a feed passage; a gap 7 in land 5 permits comminuted material to be discharged into the grass-catcher of the mower in the usual way. The mower is attached to the upper surface of base plate 1 by means of such as over-centre clamps, toggle clamps or the like; to form a seal between the mower skirt and base paste, there may be provided an elastomeric, annular gasket within land 5.

When the attachment is in use, base plate 1 rests at an angle $\theta$ to the ground, angle $\theta$ being from, say, 5° to perhaps 30°. Base plate 1 may be made of wood, particle board, metal, or a suitable plastic material.

Associated with the base plate 1 is a feed hopper 8, which is preferably formed of a plastic or similar resilient material. The feed hopper 8 communicates with the upper face of the base plate by way of a feed passage 9 at or adjacent the base of the feed hopper 8, a mouth 6 being provided and communicating with an opening or aperture in the base plate upper face. A primary feed inlet 10 of the hopper 8 may be provided with a hinged cover 11, and thus vegetable matter to be mulched is able to be fed into the hopper 8 through the feed inlet 10, to be passed through the feed passage 9 for discharge into the cutting region of the mower through the mouth 6.

The feed hopper 8 is preferably made of plastic, and if so, then the feed passage mouth 6 may be provided with or bounded by one or more cutter bar members 12 which are easily replaceable when they become worn by repeated contact with material being comminuted by the shearing action of mower blades against cutter bar means 12. Referring to FIG. 4 of the drawings, such a cutter bar 12 is shown and may have an additional centre bar 13 to assist with fine comminution of vegetable matter. It should be appreciated that if desired a plurality of cutter bars 12 may be provided.

The feed passage 9 is preferably formed of plastic and is attached or secured to the base plate 8, about the mouth 6, in such a manner that when a mower is mounted on the base plate 8, as will be described further hereinafter, and duly actuated, the normal vibratory moment that is generated by operation of a rotary motor mower will be imparted to the feed passage 9 which will therefore vibrate. It has been found that this is particularly advantageous in the present invention, as the vibratory moment imparted to the feed passage 9 causes the feed passage to vibrate while remaining attached to the base plate, and while remaining part of the feed hopper 8, the vibration substantially diminishing the chance of vegetable matter becoming clogged in the feed passage during a passage therethrough. As will be appreciated, wet vegetable matter has a tendency to become clogged and the vibration of the feed passage 9, by virtue of the formation of the feed passage 9 and its mounting relative to the base plate, will substantially inhibit or diminish such clogging. It has also been found that the vibratory moment as imparted to the feed passage 9 assists in actual passage of vegetable matter through the feed passage to the base plate.

Feed hopper 8 may be provided with an internal baffle 14 which stops just short of the base 15 of the hopper 8 to thus leave a secondary, front-opening feed inlet—the slit 16—through which such vegetable matter as cuttings and twigs, etc. may be fed for mulching. This secondary feed inlet slit 16 may be closed off by a hinged cover 17. While internal baffle 14 serves to guide, or channel, fed vegetable matter to the cutting region, the feed hopper may be constructed with a similarly sloped front panel 18, as is to be seen in FIG. 2, in which case the secondary feed inlet is located as indicated at 19 and is closed off by a hinged cover 20.

Figure 5:
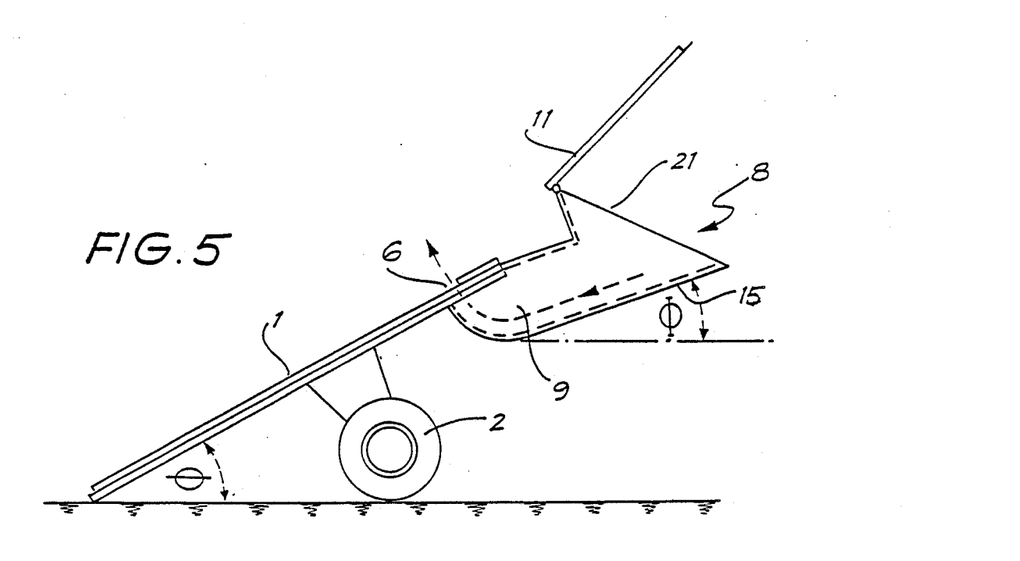
FIG. 5 is a side elevation of a second preferred embodiment.
Figure 6:
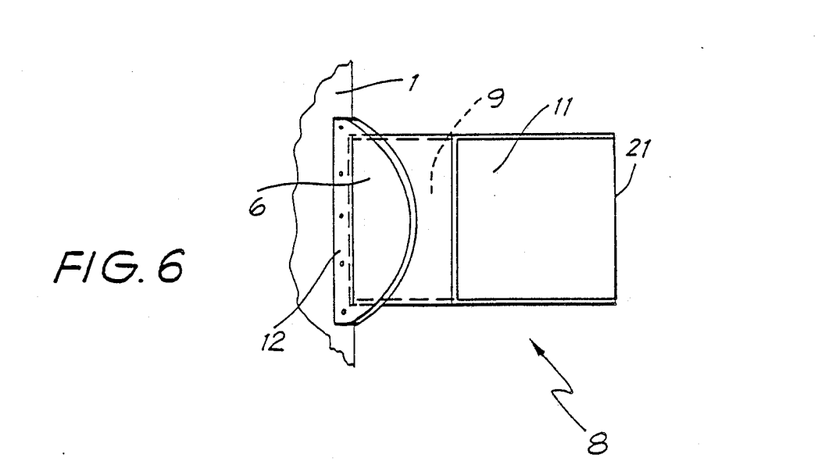
FIG. 6 is a fragmentary corresponding plan view.

A further embodiment is shown in FIGS. 5 and 6 of the drawings.

In this embodiment, all material to be comminuted into mulch is fed through a single opening 21 of a simplified hopper 8. The optimum angle $\theta$ for the base of the hopper with respect to the ground is perhaps 15°, which promotes movement of material into the feed passage 9 where suction then conveys it into the cutting region through feed passage mouth 6. Opening 21 of simplified hopper 8 may well optionally be provided with a hinged cover or lid 11. Long cutting, grass-stems, twigs, etc. are simply placed on the base 15 of feed hopper 8 and fed manually into feed passage 9 for suction into the cutting region at mouth 6. The base plate 8 is preferably mounted or positioned above and at an angle relative to the ground.

In a preferred embodiment of the present invention, as illustrated with particular reference to FIGS. 7 to 10A and 10B of the accompanying drawings, the mulching arrangement again comprises a base plate 101. In this form of the invention means are provided whereby the base plate can be moved from one position to another, for example from one position adjacent the ground and in which a mower can be placed on or removed from the base plate with ease to another position in which the base plate is positioned and located substantially above the ground, with a mower mounted thereon and at a predetermined or desired angle relative to the ground.

A pair of elongate and laterally spaced apart swingable arms 103 are provided, mounted on an elongate axle shaft 104 which extends transversely below an underside of said base plate 101, the axle 104 and ends of the arms 103 being housed or journalled such as in support means 104A, wheels 102 are mounted at each end of the laterally spaced apart arms 103, it being preferred that one arm 103 be provided on each side of the base plate 101. Lever means 105 are provided attached to and extending upwardly from one of the arms 103, so that movement of the lever 105 is capable of moving the arms 103 and wheels 102 into a first position in which, as shown for example in FIG. 9 of the drawings, the base plate 101 is adjacent to or positioned on the ground and in which position a motor mower is able to be placed onto or removed from the upper surface of the base plate 101 in a straight-forward and efficient manner. In such a position the lever 105 moves downwardly so as to be substantially flush with and in juxtaposition with the upper surface of the base plate 101.

The lever 105 is also so formed and mounted that it is capable of being moved so that it extends substantially upwardly from the swinging arms 103 and wheels 102 (such as for example shown in FIG. 7 of the accompanying drawings) in which position the swinging arms 103 and wheels 102 extend downwardly below the underside of the base plate 101 and maintain the base plate 101 in a position essentially above the ground and angled relative thereto at a predetermined or desired angle.

Figure 9:
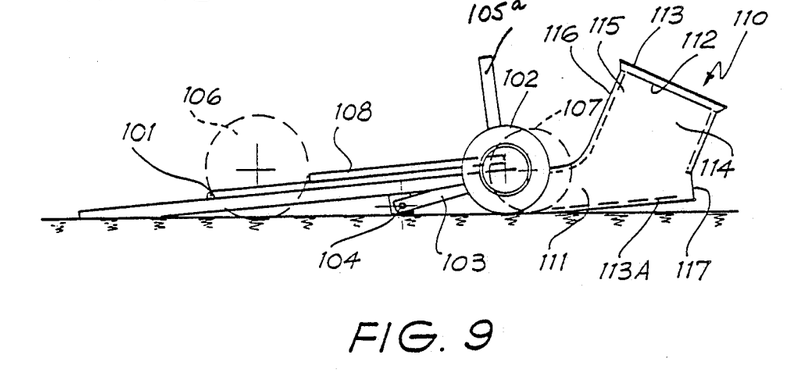
FIG. 9 shows the attachment in a "collapsed" position for the convenient mounting of a lawnmower therein.
Figure 10:
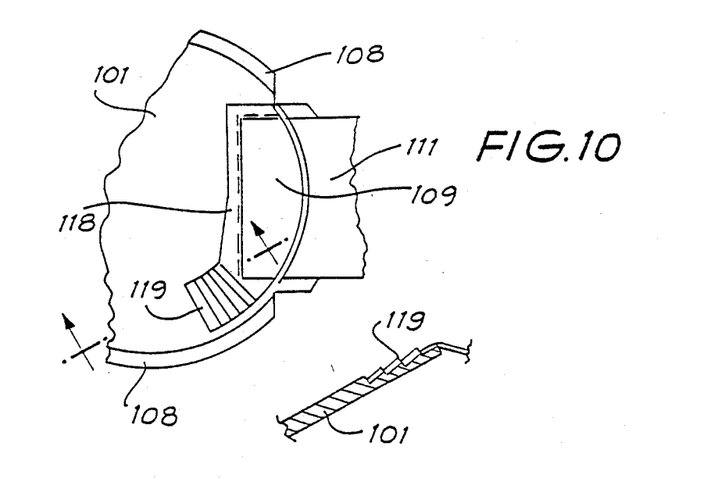
FIG. 10A is a fragmentary plan view showing the cutter bar arrangement in greater detail.
FIG. 10B is a sectional view taken along the line 10B—10B of FIG. 10A.

An abutment strut 105A is provided against which the lever 105 abuts in its position in which the base plate 101 is above and angled relative to the ground, appropriate releasable locking means being provided so that the lever 105 can be releasably held in position by or against the abutment 105A to hold the base plate 101 (together with any mower mounted thereon) in the raised and angled position. When it is desired to return the base plate 101 to a position in juxtaposition with the ground (such as shown in FIG. 9 of the drawings), the lever 105 is released and is moved downwardly so as to move the arms and wheels downwardly into a position adjacent the underside of the base plate 101 into a position generally shown in FIG. 9 of the accompanying drawings.

It will be appreciated that the above has substantial advantages in that motor mowers can be relatively heavy pieces of equipment and it is often difficult to effectively mount such mowers to base plates which are at a fixed raised and angled position. This form of the invention overcomes such a problem. When the base plate is in its lowered position such as shown in FIG. 9 of the drawings, a mower may be essentially wheeled or slightly lifted into position above the base plate 101 and can, for example, be placed into position by operation of the height adjustment mechanism of the mower. This is however by way of example. When the mower is positioned on the base plate 101 in the correct and/or desired position, it may be held and secured thereon by means of bolts, toggle clamps, over-centre clamps and the like.

It should be appreciated that while the invention has been described by way of example only, with reference to a particular means for raising and lowering the base plate, relative to the ground surface, other means can be utilized to advantage. It should be appreciated however that it is particularly important that the base plate be at an angle relative to the ground surface and that means be provided to hold the base plate (and any mower mounted thereon) at an angle inclined relative to the ground surface or horizontal.

Figure 7:
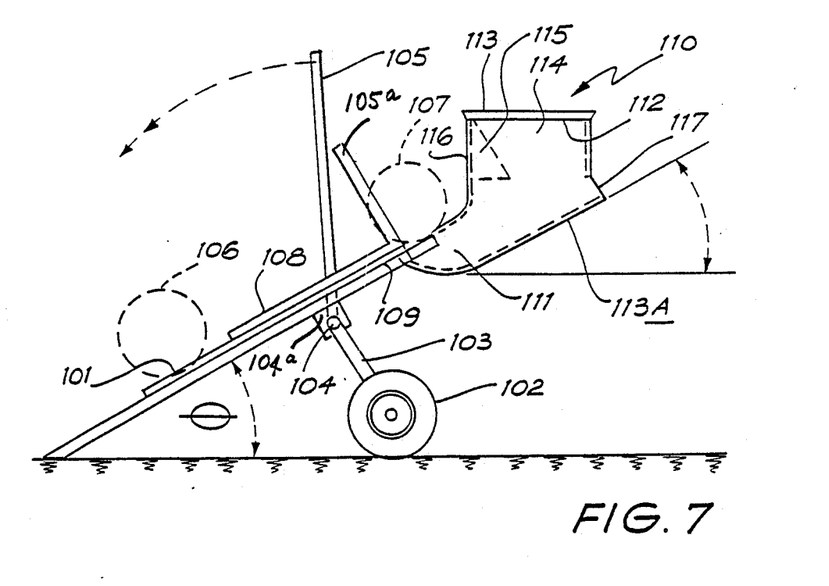
FIG. 7 is a side elevation of a third preferred embodiment.
Figure 8:
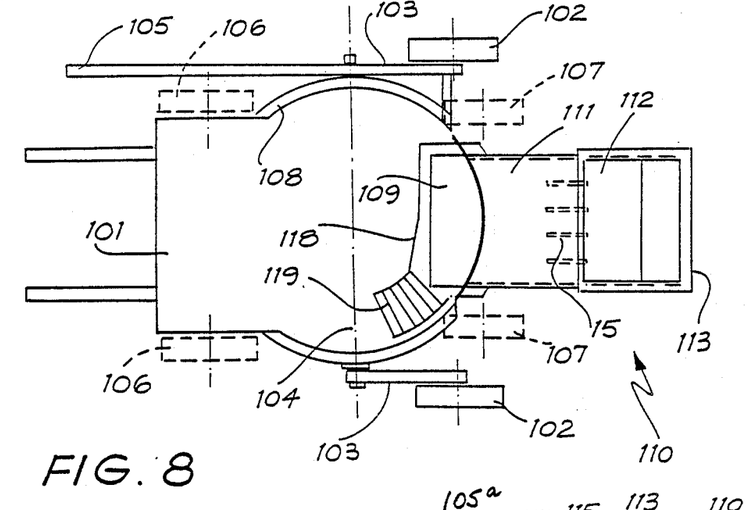
FIG. 8 is a corresponding plan view.

The lawnmower per se is not shown in the drawings but its wheels are indicated in chain-line at 106 and 107. The skirt of the mower fits snugly within the raised, part-circular land 108 and covers mouth 109 of a feed passage; to form a seal between the mower skirt and the base plate 101, there may be provided an elastomeric, annular gasket within land 108. Base plate 101 may be fabricated from, say, wood, particle board, metal or suitable plastic material.

In preferred forms of the present invention (with particular reference to FIG. 7 of the drawings), associated with base plate 101 is a feed hopper, generally referenced 110, ideally a plastic molding. Feed hopper 110 is in communication with the upper face of base plate 101 via a feed passage 111 and the said mouth 109. A primary feed inlet 112 of hopper 110 may have a hinged cover or lid 113 so that vegetable matter to be comminuted into mulch may be fed into hopper 110 through feed inlet 112 and which passes through feed passage 111 for discharge into the cutting region of the mower via feed passage mouth 109.

It has become apparent that the base 113A of the hopper 110 must be angled and inclined relative to the ground, the greater the angle between the base 113A of the hopper 110 and the ground, the better the feed characteristics. For example, leaves and the like have less tendency to bunch and obstruct the feed hopper and feed passage, and a faster transfer of material to the mouth 109 is attainable, the greater the angle between the base 113A of the hopper 110 and the ground. The optimum angle may be approximately the same as the angle of elevation of the base plate 101 with respect to the ground, and in certain forms of the invention the base plate 101 and base 113A of the feed hopper may be substantially parallel one with the other. The angle of inclination of the hopper base 113A relative to the ground, may vary but it has been found that an angle of about 15° will give a lower feed rate. On the other hand, an angle of perhaps 30° or more will give a considerably faster feed rate. The angle of inclination above the hopper base 113A can vary, and could for example be 45° relative to the ground surface.

Feed hopper 110 has a short "neck" 114 provided with a number of baffles, plates, or fins 15 projecting from its mower facing wall 116; these are so dimensioned as to prevent entry of an operator's fingers into the cutting region.

In order to provide for the shredding and mulching of elongated vegetable material such as cuttings, twigs, vines, and the like not readily feedable to the cutting region through the primary feed inlet 112, there is a full-width secondary feed inlet 117 in the outwardly facing wall of hopper 110. The lower edge of this secondary feed inlet 117 is contiguous with hopper base 113A, and its height, while being sufficient to permit entry of vegetable matter to be comminuted, is still not great enough to allow an operator's hand to intrude into the cutting region.

The feed hopper 101 is preferably made of a plastic material or similar resilient material, and the feed passage 109 may well be bounded by a primary cutter bar 118, at or adjacent the mouth 109 thereof. However, the mulching action of mower blades may be enhanced by the provision of ancillary cutter bars 119, such as for example disposed radially with respect to the drive shaft of the lawnmower. All the cutting bars may have hardened edges to prolong their cutting lives, or may alternatively be made from one of a number of forged, cast, fabricated metals or other suitable materials.

It is an important feature of the present invention that the passage of vegetable matter through the feed hopper is substantially assisted and enhanced by the combination of the downward inclination of the base 113A of the hopper and the vibration of the hopper (and the hopper base 113A and feed passage 111) having regard to the mounting of the hopper and feed passage to the base plate, in such a manner that when a mower mounted on the base plate is actuated, vibrations from the mower will be imparted from the mower and base plate to the feed hopper and thus to the base 113A of the feed hopper and to the feed passage 111. This vibratory moment causes the vegetable matter to vibrate and prevent or substantially diminishes clogging. The vibration, in association with the inclined planar surface of the base 113A substantially increases passage of matter through the feed hopper and diminishes substantially or avoids clogging of matter. When the vegetable matter reaches the feed passage 111, the action of the motor mower above the mouth 109 of the feed passage 111, will cause suction which will suck the vegetable matter up through the mouth into the mulching zone of the mower, whereafter the matter will be subjected to action of the blades of the motor mower, and thereafter discharged.

It will be appreciated that to operate the mulching arrangement of the present invention, the mower is placed upon the base plate and secured thereto by appropriate means, so that the skirt of the mower is substantially sealed to or in juxtaposition with the upper surface of the base plate except at the discharge gap. Once the mower has been mounted on the base plate, the base plate is raised above and relative to the ground at a predetermined angle, by operation of the lever means 105, the arms 103 and wheels 102. It will be appreciated that the wheels 102 allow the mulching arrangement of the present invention to be moved from place to place. Once the base plate is in its raised and desired position, the motor is started and this causes a vibratory moment which is imparted to the base plate and which is also imparted to the duly formed and attached feed passage of the hopper. The matter to be mulched, such as vegetable matter, is passed through either one or both of the feed inlets of the hopper and is thereafter moved through the feed passage, clogging being substantially diminished or avoided by the vibratory moment imparted thereto. As indicated and described hereinbefore, the combination of the vibration of the feed hopper (and in particular the base thereof and feed passage) together with the downward inclination of the base of the feed hopper relative to the ground surface, contributes to and substantially assists in the passage of matter through the feed hopper, this also minimizing clogging of matter within the feed hopper. Where material to be mulched is of a generally small dimension, it will usually be fed into the primary feed inlet while the secondary feed inlet is closed. On the other hand, where material is in the form of twigs, cuttings and similar elongate matter, it may be fed into the secondary feed inlet. It has been found that by using the present invention, even tough material such as eucalypt leaves, bark, conifer cones and large twigs and canes are able to be converted into mulch. The selection of the appropriate feed inlet is of course at the discretion of an operator, depending upon the nature and size of the matter to be processed.

The mulching attachment is easily portable and light in weight, especially when its construction is of plastic Moreover, it can be taken to the site of material to be mulched, being independent of electrical power outlets. The efficiency and effectiveness of the present invention is high due to several advantageous factors, for instance, an average 1/C-engined rotary mower makes about 3.5 H.P. available for mulching as against the 1.5 H.P. of the electric motor of a conventional mulcher. There again the peripheral velocity of the mower blades is approximately three times that of conventional mulchers for the same R.P.M. figure—that is to say, an average rotary mower has a cutting circle of about 450 mm diameter compared to perhaps a 150 mm diameter cutting circle of the conventional mulcher. The mulching attachment is largely self-cleaning and, as will be appreciated, the chances of the feed passage becoming clogged with green, and often wet, vegetable matter is substantially diminished.

From the abovegoing it will be readily appreciated by those skilled in the art that numerous variations and modifications may be made to the invention without departing from the scope thereof, as defined in the appended claims.

I claim:

1. A mulching attachment for a rotary, motor lawnmower, said attachment comprising a base plate upon an upper surface of which a rotary, motor lawnmower is removably mountable; and including a feed hopper attached thereto and being adapted to receive vegetable matter to be converted to mulch; an aperture being provided in said base plate; means being provided to allow said base plate to be held in position above and at an inclined angle relative to, ground surface; said hopper including at least one feed inlet therein and an elongate base and feed passage; said feed hopper base being substantially planar and inclined downwardly at an angle relative to said ground surface; said feed passage extending into a mouth which communicates with said base plate; said feed passage being so formed and mounted relative to said base plate, that on operation of a lawnmower mounted on said base plate, a vibratory moment is imparted from said lawnmower and base plate to said feed hopper; the arrangement being such that vegetable matter is fed into said feed hopper through at least one feed inlet; said vibration imparted to said feed passage and the base of said feed hopper, combined with said downwardly inclined base of said feed hopper, enhancing passage of said vegetable matter therethrough and inhibiting or preventing clogging of vegetable matter as it passes over the base of said feed hopper and through said feed passage; said vegetable matter thereafter being drawn through the mouth of said feed passage by suction generated by operation of said lawnmower, to enter a cutting zone of said lawnmower and to be thereafter discharged therefrom.

2. A mulching attachment as claimed in claim 1, wherein said upper surface of the base plate is formed or provided with a raised, semi-circular land within which a skirt of said mower is adapted to fit so as to cover a mouth of said feed passage; a space in said land permitting comminuted material to be discharged through said discharge chute of said mower.

3. A mulching attachment as claimed in claim 1 or claim 2, characterized in that said base plate is adjustable from a first position in which it rests on or substantially adjacent to a ground surface, to allow for location or removal of a mower, and a second position in which said base plate is raised above the ground at a predetermined or desired angle relative thereto.

4. A mulching attachment as claimed in claim 1, characterized in that a pair of laterally spaced apart swingable arms are pivotally mounted to said base plate, one on each side thereof and both extending downwardly below an underside of said base plate, an elongate transverse axle shaft extending transversely below said base plate and connecting said axis; said axle shaft being mounted to the underside of said base plate; wheels being mounted at or adjacent lower ends of said arms; lever means being connected to at least one of said spaced apart arms, the arrangement being such that said lever means is adapted to move said arms, wheels and base plate, into a juxtaposed position on or adjacent to a ground surface to allow for the mounting or removal of a mower to the upper surface of said base plate; further movement of said lever means moving said arms and said base into a position in which the base plate is above said ground surface at a predetermined or desired angle thereto; means being provided to releasably lock or secure said lever means in a position in which the base plate is substantially above and angled relative to said ground surface.

5. A mulching attachment as claimed in claim 1, characterized in that said feed hopper has a primary feed inlet and a secondary feed inlet.

6. A mulching attachment for a rotary, motor lawnmower, said attachment comprising a base plate upon an upper surface of which a rotary, motor lawnmower is removably mountable; and including a feed hopper attached thereto and being adapted to receive vegetable matter to be converted to mulch; an aperture being provided in said base plate; means being provided to allow said base plate to be held in position above and at an inclined angle relative to, ground surface; said hopper including at least one feed inlet therein and an elongate base and feed passage; said feed hopper base being substantially planar and inclined downwardly at an angle relative to said ground surface; said feed passage extending into a mouth which communicates with said base plate; said feed passage being so formed and mounted relative to said base plate, that on operation of a lawnmower mounted on said base plate, a vibratory moment is imparted from said lawnmower and base plate to said feed hopper; the arrangement being such that vegetable matter is fed into said feed hopper through at least one feed inlet; said vibration imparted to said feed passage and the base of said feed hopper, combined with said downwardly inclined base of said feed hopper, enhancing passage of said vegetable matter therethrough and inhibiting or preventing clogging of vegetable matter as it passes over the base of said feed hopper and through said feed passage; said vegetable matter thereafter being drawn through the mouth of said feed passage by suction generated by operation of said lawnmower, to enter a cutting zone of said lawnmower and to be thereafter discharged therefrom; and wherein a pair of laterally spaced apart swingable arms are pivotally mounted to said base plate, one on each side thereof and both extending downwardly below an underside of said base plate; an elongate transverse axle shaft extending therebetween below, and being mounted to the underside of said base plate; and wheels being rotatably mounted at or adjacent distal ends thereof; lever means being connected to or formed with at least one of said arms; movement of said lever means to a position in substantial juxtaposition with said base plate moving said arms and wheels into a position relative to the base plate and the ground, whereby said base plate is adjacent and/or at a slight angle to the ground surface such as to allow for mounting or removal of a mower to or from said upper surface of said base plate; further movement of said lever means to a predetermined position, moving the arms and wheels relative to the base plate such that the base plate is positioned substantially above the ground, at a predetermined or desired angle thereto, means being provided to releasably engage with said lever means such as to maintain said base plate in such a position substantially above and at an angle relative to, the ground, for a predetermined or desired period of time.

* * * * *

UNITED STATES PATENT AND TRADEMARK OFFICE
CERTIFICATE OF CORRECTION

PATENT NO. : 4,969,321

DATED : November 13, 1990

INVENTOR(S) : Edward Du Moulin

It is certified that error appears in the above-identified patent and that said Letters Patent is hereby corrected as shown below:

On the Title Page item [73] delete;

"Assignee: Wells-Gardner Electronics Corporation, Chicago, Ill."

Signed and Sealed this

Fifteenth Day of September, 1992

Attest:

DOUGLAS B. COMER

*Attesting Officer*   Acting Commissioner of Patents and Trademarks